US010331738B2

(12) United States Patent
Ricker et al.

(10) Patent No.: US 10,331,738 B2
(45) Date of Patent: Jun. 25, 2019

(54) SEGMENTED VIDEO CONTENT STORAGE

(71) Applicant: Synamedia Limited, Middlesex (GB)

(72) Inventors: Clint Ricker, Lawrenceville, GA (US); Hoi-tauw Jozef Chou, San Ramon, CA (US); Gowdish Kumaraswamy, Milipitas, CA (US); David Stuart Morgan, Apex, NC (US); Ivan V. Legrand, Haddonfield, NJ (US)

(73) Assignee: SYNAMEDIA LIMITED, Middlesex (GB)

( * ) Notice: Subject to any disclaimer, the term of this patent is extended or adjusted under 35 U.S.C. 154(b) by 0 days.

(21) Appl. No.: 15/288,000

(22) Filed: Oct. 7, 2016

(65) Prior Publication Data

US 2017/0105028 A1    Apr. 13, 2017

Related U.S. Application Data

(60) Provisional application No. 62/239,373, filed on Oct. 9, 2015, provisional application No. 62/239,379, filed on Oct. 9, 2015.

(51) Int. Cl.
| *G06F 16/71* | (2019.01) |
| *G06F 16/955* | (2019.01) |
| *H04N 21/218* | (2011.01) |
| *H04N 21/231* | (2011.01) |
| *H04N 21/232* | (2011.01) |
| *H04N 21/239* | (2011.01) |
(Continued)

(52) U.S. Cl.
CPC ............ *G06F 16/71* (2019.01); *G06F 16/955* (2019.01); *H04N 21/2181* (2013.01); *H04N 21/232* (2013.01); *H04N 21/2393* (2013.01); *H04N 21/23103* (2013.01); *H04N 21/23113* (2013.01); *H04N 21/23439* (2013.01); *H04N 21/2747* (2013.01); *H04N 21/8355* (2013.01); *H04N 21/8456* (2013.01)

(58) Field of Classification Search
CPC ........ G06F 3/0619; G06F 3/065; G06F 3/068; G06F 7/30858; G06F 17/30876; G06F 16/71; G06F 16/955; H04N 21/2181; H04N 21/23113; H04N 21/232; H04N 21/2393; H04N 21/2747; H04N 21/8355; H04N 21/23103; H04N 21/23439; H04N 21/8456
See application file for complete search history.

(56) References Cited

U.S. PATENT DOCUMENTS

2010/0172628 A1*  7/2010  Berger .................. H04N 5/782
                                                              386/291
2012/0210382 A1*  8/2012  Walker .............. G06F 17/30017
                                                              725/115
(Continued)

FOREIGN PATENT DOCUMENTS

WO    2011009055 A2    1/2011

OTHER PUBLICATIONS

International Preliminary Report on Patentability corresponding PCT/US2016/056133 dated Apr. 10, 2016.

*Primary Examiner* — Chenea Davis
(74) *Attorney, Agent, or Firm* — Fernando & Partners, LLP; Ying Li

(57) ABSTRACT

In one embodiment, a method includes receiving a segment of content, determining that the segment is referenced by at least one active record of a recordings database, and, responsive to the determination, storing the segment.

20 Claims, 6 Drawing Sheets

(51) Int. Cl.
*H04N 21/2747* (2011.01)
*H04N 21/8355* (2011.01)
*H04N 21/2343* (2011.01)
*H04N 21/845* (2011.01)

(56) References Cited

U.S. PATENT DOCUMENTS

| | | |
|---|---|---|
| 2012/0294591 A1 | 11/2012 | Alexander |
| 2013/0142499 A1 | 6/2013 | Major et al. |
| 2014/0157324 A1* | 6/2014 | Mao ..................... G06F 17/301 725/54 |
| 2014/0165116 A1* | 6/2014 | Major ................. G06F 21/6218 725/89 |
| 2014/0331103 A1 | 11/2014 | Grube et al. |
| 2016/0269688 A1* | 9/2016 | Gardner ........... H04N 21/23116 |

\* cited by examiner

250
SEGMENTED VIDEO CONTENT STORAGE

CROSS-REFERENCES TO RELATED APPLICATIONS

This application claims priority to U.S. Provisional Patent App. Nos. 62/239,373 and 62/239,379, both filed Oct. 9, 2015, and both hereby incorporated by reference in their entirety.

TECHNICAL FIELD

The present disclosure relates generally to storage systems, and in particular, to systems, methods and apparatuses enabling storage of video content data for multiple users.

BACKGROUND

The ongoing development, maintenance and expansion of storage systems often involves providing storage of data for multiple users. As the number of users increases, the amount of signaling, bandwidth used, and metadata stored increases, degrading the efficiency of the storage system.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
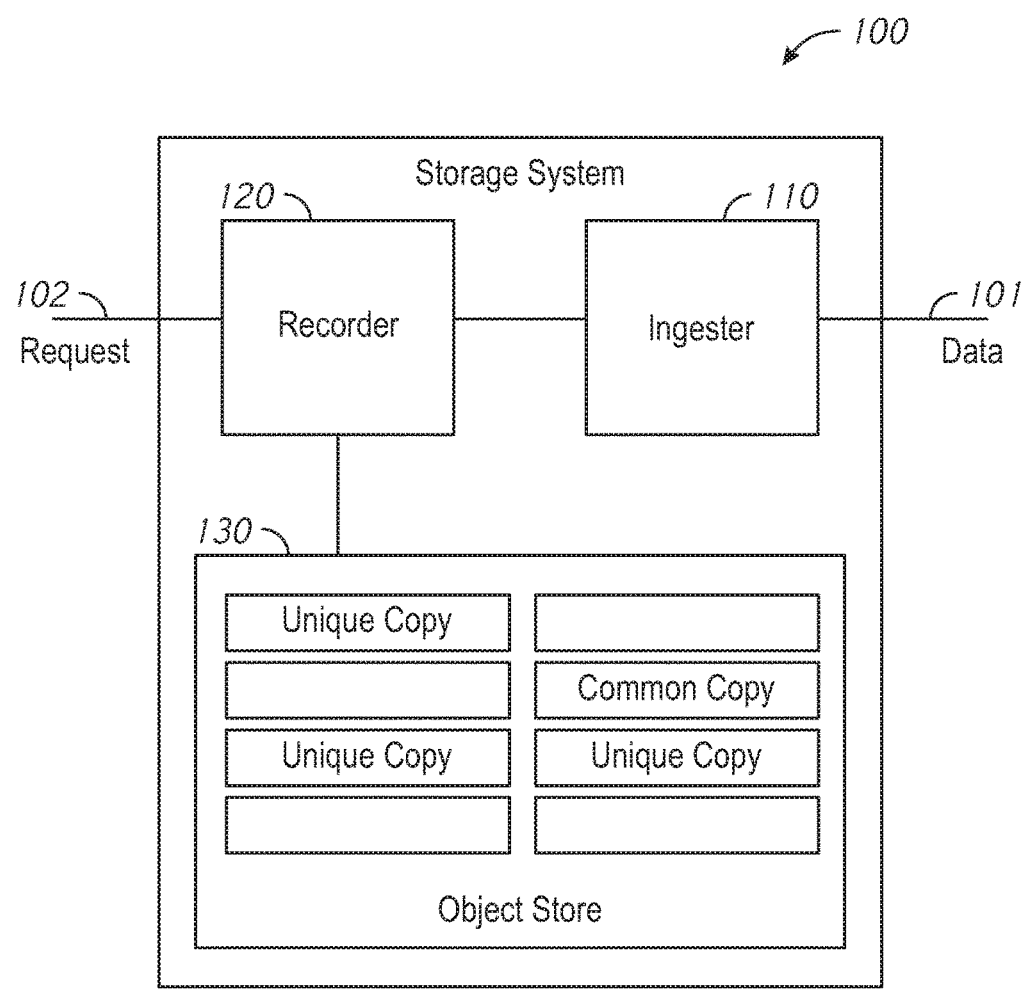
FIG. 1 is a block diagram of a storage system in accordance with some implementations.

In accordance with common practice various features shown in the drawings may not be drawn to scale, as the dimensions of various features may be arbitrarily expanded or reduced for clarity. Moreover, the drawings may not depict all of the aspects and/or variants of a given system, method or apparatus admitted by the specification. Finally, like reference numerals are used to denote like features throughout the figures.

DESCRIPTION OF EXAMPLE EMBODIMENTS

Numerous details are described herein in order to provide a thorough understanding of the illustrative implementations shown in the accompanying drawings. However, the accompanying drawings merely show some example aspects of the present disclosure and are therefore not to be considered limiting. Those of ordinary skill in the art will appreciate from the present disclosure that other effective aspects and/or variants do not include all of the specific details of the example implementations described herein. While pertinent features are shown and described, those of ordinary skill in the art will appreciate from the present disclosure that various other features, including well-known systems, methods, components, devices, and circuits, have not been illustrated or described in exhaustive detail for the sake of brevity and so as not to obscure more pertinent aspects of the example implementations disclosed herein.

Overview

Various implementations disclosed herein include apparatuses, systems, and methods for efficiently storing data for multiple users. For example, in some implementations, a method includes a method includes receiving a segment of content, determining that the segment is referenced by at least one active record of a recordings database, and, responsive to the determination, storing the segment.

Example Embodiments

When streaming media content for consumption by multiple users is received by a storage system, policies may indicate that a single common copy be stored for consumption by any of the users (or at least a subset of the multiple users) or that a unique copy be stored for consumption by each individual user (or at least the users not in the subset). Such policies may be based on legal requirements associated with the content, limitations of the storage system (e.g., available storage space), or other factors.

The policies may vary by the location of the multiple users and the content. For example, in order to fit within fair use of copyright, a policy can dictate that a scripted drama television program be stored as a unique copy for each individual user. As another example, a policy can dictate that an educational program can be stored as a single common copy for consumption by any user. As another example, a policy can dictate that any programs from a public broadcasting channel can be stored as a single common copy for consumption by any user. As another example, a policy can dictate that particular programs or channels for which rights have been negotiated can be stored as a single common copy for consumption by any user.

In some embodiments, a policy can indicate that a common copy be stored for consumption by any of a subset of the users (e.g., users in a first jurisdiction) and that a unique copy be stored for consumption for each individual user not within the subset. For example, a policy can dictate that a broadcast of a college sporting event can be stored as a single common copy for consumption by any user within the state of the college, but that unique copies of the sporting event be stored for consumption by individual users not in the state.

Storing a unique copy of streaming media content for each user presents a number of challenges, including the storage space used in storing multiple copies of the same data. Accordingly, it is desirable to store data for multiple users using a single common copy if possible (e.g., allowed by policy). On many cloud-based DVR systems, up to half of all recording requests can be for non-standard times (e.g., not limited to the changing of the hour or half-hour). Further, a storage system can receive recording requests for media content with a wide degree of variance in the start times and end times. For example, two users requesting recording of a show nominally broadcast between 8:00 pm and 9:00 pm can request recordings from 8:00 pm to 9:00 pm and from 7:57 pm to 9:03 pm, respectively.

Various implementations described include a storage system that can simultaneously store content under different storage policies, such common copy storage or unique copy storage, and can map the wide variety of schedule requests to the underlying recordings such that all users, including users sharing the same content, have their own personalized view of the content based on their schedule request.

FIG. 1 is a block diagram of a storage system 100. While certain specific features are illustrated, those of ordinary skill in the art will appreciate from the present disclosure that various other features have not been illustrated for the sake of brevity and so as not to obscure more pertinent aspects of the example implementations disclosed herein. To that end, the storage system 100 includes an ingester module 110 that receives data 101, a recorder module 120 that receives requests 102 to store the data 101 for a user, and an object store 130 that stores the data 101. The object store 130 includes a number of storage locations at which objects can be stored. The object store 130 can store, among other things, a unique copy of the data 101 for each of a number of requesting users and a common copy of the data 101 that is shared between a number of requesting users.

Each of the modules 110, 120, 130 of the storage system can be implemented on the same or separate computing devices. In some implementations, the object store 130 can be a distributed object store including multiple computing devices networked over multiple locations.

In some implementations, the storage system 100 is configured to store video data associated with multicast (e.g., broadcast) content and, thus, acts as a digital video recorder (DVR). As both the data 101 and the requests 102 can be received over a network, the storage system 100 can function as a cloud-based DVR.

Figure 2:
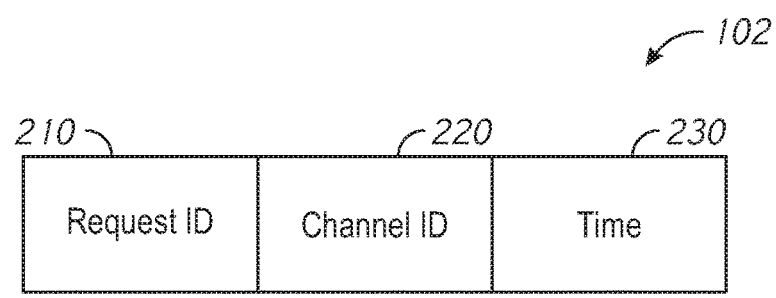
FIG. 2 is a block diagram of a recording request in accordance with some implementations.

As an example, a user can use the storage system 100 to record a television program within the storage system and watch the television program at a time later than the broadcast time. To that end, the recorder module 120 receives a recording request 102 from a user indicating that the user desires to record a particular television program. As shown in FIG. 2, the recording request 102 can include a recording request identifier (ID) 210, a channel ID 220, and temporal data 230 indicative of a time span of the recording.

The recording request ID 210 (referred to as a "request ID") can be a unique identifier that is different for each recording request. For example, the request ID 210 can be a UUID (universally unique identifier). In some implementations, the request ID 210 includes a user ID or, at least, indicates a user identifier or user device (such as a set-top box).

The channel ID 220 can be an identifier that indicates a broadcast channel or sub-channel (also referred to as profiles). In some implementations, a broadcast channel can include sub-channels with multiple versions of the same broadcast. For example, the broadcast channel can include sub-channels (also referred to as channels) with video data at different bitrates or with different audio/subtitles. Thus, in some implementations, the channel ID 220 indicates a broadcast channel and the recording request 102 further includes data indicating the sub-channel or profile. In some implementations, the channel ID 220 indicates the sub-channel or profile.

In various implementations, the temporal data 230 can indicate the time span of the recording in a variety of ways. In some implementations, the temporal data 230 indicates a start time and an end time of the recording. In some implementations, the temporal data 230 indicates a start time and a recording length of the recording. In some implementations, the temporal data 230 indicates one or more standard programming slots (e.g., 8:00 pm to 8:30 pm and 8:30 pm to 9:00 pm) and the recorder module 230 determines the time span of the recording based on the programming slot.

In response to receiving the recording request 102, the recording module 120 instructs the ingester module 110 to receive (or retrieve) data 101 from the indicated channel (or sub-channel) during the time span and return the data 101 to the recorder module 120. When received from the ingester module 110, the recorder module 120 stores the data 101 in the object store 130 for later access for the user according to a storage policy.

When multiple users submit requests to store the same data (e.g., record the same content), the recorder module 120 can handle the multiple requests in a number of ways to improve efficiency of the storage system 100. For example, the recorder module 120 can receive a first recording request (having a first request ID, a channel ID, and temporal data) and a second recording request (having a second request ID, the same channel ID, and the same, or at least overlapping, temporal data).

In some implementations, the recorder module 120 receives the data from the ingester module 110 and, for each recording request, instructs the object store 130 to store a unique copy of the data as a separate object in the object store 130. For example, the recorder module 120 can submit a first PUT command to the object store 130 including the data and can further submit a second PUT command to the object store 130 including the second request ID and the data. The recorder module 120 can store metadata associating the first request ID with the object created by the first PUT command and associating the second request ID with the object created by the second PUT command.

However, such implementations may be inefficient for large numbers of recordings. Nevertheless, storage policy may dictate that such an implementation be employed for at least some recording requests. Such implementations include multiple PUT commands from the recorder module 120 increasing the overhead of the signaling. Such implementations also include the recorder module 120 pushing identical data to the object store 130 multiple times, inefficiently using network bandwidth and increasing the overhead of transport. Further, creation of a large number of objects can create a sizable amount of metadata to be managed by the recorder module 120.

Thus, in some implementations, the recorder module 120 receives the data from the ingester module 110 and instructs the object store 130 to store a common copy of the data as a single object in the object store 130. The recorder module 120 can store metadata associating the first request ID with the object created by the PUT command and associating the second request ID with the same object.

When the two requests reference overlapping times, but not the same time, the recorder module 120 can, in some implementations (as described above) create a unique copy for each request. In some implementations, the recorder module can create a copy from the earliest start time to the latest end time. For example, if the first request indicated 7:59 pm to 8:30 pm and the second request indicated 8:00 pm to 8:35 pm, the recorder module 120 can store an object including the content between 7:59 pm and 8:35 pm. Further, the recorder module 120 can include bookmarks in the content that represent the requested subsections of each request.

In some implementations, the data 101 received by recorder module 120 is video data broken into segments of approximately 2 seconds. In some implementations, the segments may be other lengths of time, e.g., between approximately 2 seconds and 10 seconds. In some implementations, the data 101 is received by the ingester module 110 as segments. In some implementations, the data 101 is converted by the ingester module 110 into segments before being sent to the recorder module 120.

Thus, in some implementations, in response to receiving a recording request, the recorder module 120 creates a database record including the request ID, data indicative of the channel (or sub-channel or other source), data indicative of the start time and end time, and data indicative of a storage policy. The storage policy can signal directives such as common/unique copy storage per user, resiliency, and so forth. In particular, the storage policy can indicate whether a unique copy of the content is to be stored for the user or whether a common copy of the content to be stored can satisfy the recording request. The storage policy can be based on a number of factors, such as the location of the requestor of the recording request (e.g., the user), the source of the content, the nature of the content (e.g., educational or public domain), or rights to the content.

In response to receiving a segment from the ingester module 110, the recorder module 120 determines whether there is at least one recording scheduled for the segment (e.g., whether the time of the segment is between the start time and end time of a database record indicating the source of the segment).

If so, the recorder module 120 will write the segment to the object store 130. In some implementations, the recorder module 120 stores a unique copy of the segment for each recording scheduled for the segment with a storage policy indicating storage of a unique copy. Further, the recorder module 120 stores a common copy of the segment if there is at least one recording scheduled for the segment with a storage policy indicating storage of a common copy.

In some implementations, the recorded segments are written to the object store 130 using deterministic key names such that a particular segment can be retrieved by the channel ID, start time, and end time. Alternatively, in some implementations, the recorder module 120 can store a lookup table associating segment information (e.g., channel ID, start time, and end time) to an object identifier of the object store 130. In some implementations, the table can, instead or additionally, be stored in the object store 130.

When the recorder module 120 receives a read request for a particular recording request (e.g., a read request indicating a request ID), the recorder module 120 reads the database to determine the channel ID, start time, and time for the recording request. The recorder module 120 determines a set of objects to retrieve from the object store 130 (either using the lookup table or heuristics based on the deterministic key names). The recorder module 120 reads the set of objects from the object store 130 and returns them in response to the read request.

In some implementations, when a recording deletion request indicating a request ID is received by the recorder module 120, the recorder module 120 removes the request ID from its database (or marks it deleted, invalid, or inactive). Thus, such a recording request (or record in the database) is not considered when determining whether or how to store a received segment. Further, the recorder system 120 can periodically delete stored segments that are not referenced by any active recording requests in the database.

In some implementations, the recorder module 120 can receive a record modification request to modify the start time and end time of a recording request stored in the database. If the segments indicated by the modified start time and end times of the record modification request are stored in the object store, the recorder module 120 indicates that the request was successful and modifies the record of the database to include the modified start time and end time. Thus, a user can modify the timespan of a recording even after the start time and/or the end time of the recording has passed.

Figures 3, 4:
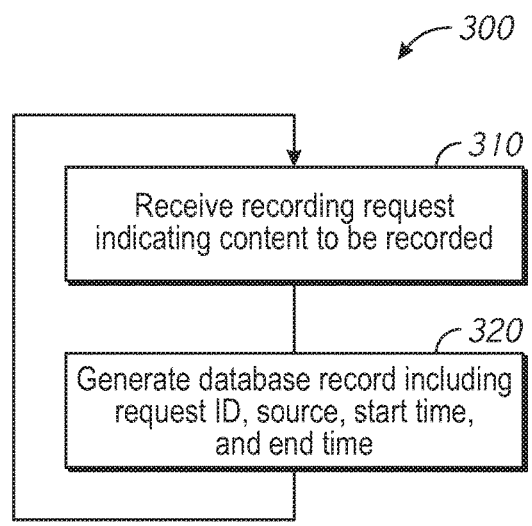
FIG. 3 is a flowchart representation of a method of handling a recording request in accordance with some implementations.
FIG. 4 is a block diagram of an example recordings database in accordance with some implementations.

FIG. 3 is a flowchart representation of a method of handling a recording request in accordance with some implementations. In some implementations (and as detailed below as an example), the method 300 is performed by a recorder module, such as the recorder module 120 of FIG. 1. In some implementations, the method 300 is performed by processing logic, including hardware, firmware, software, or a combination thereof. In some implementations, the method 300 is performed by a processor executing code stored in a non-transitory computer-readable medium (e.g., a memory). Briefly, the method 300 includes receiving a recording request and generating a database record corresponding to the recording request.

The method 300 begins, in block 310, with the recorder module receiving a recording request indicating content to be recorded. In some implementations, the recording request includes data indicative of a source (e.g., a channel or sub-channel) and temporal data indicative of a time span of the recording. As noted above, the temporal data can indicate the time span of the recording in a number of ways.

At block 320, in response to receiving the recording request, the recorder module 320 generates a database record in a recordings database including a request ID, a source ID, data indicative of a start time, data indicative of an end time, and data indicative of a storage policy. In various implementations, the data indicative of the start time and end time can be stored as temporal data in a variety of ways. In some implementations, the recording request includes the request ID. In some implementations, the recorder module assigns the request ID to the recording request and, optionally, returns the request ID to the requestor.

In some embodiments, generating the database record includes determining a storage policy for the recording request. In particular, the storage policy can indicate whether a unique copy of the content is to be stored for the user or whether a common copy of the content to be stored can satisfy the recording request. The storage policy can be based on a number of factors, such as the location of the requestor of the recording request (e.g., the user), the source of the content, the nature of the content (e.g., educational or public domain), or rights to the content.

Following block 320, the method 300 returns to block 310 where additional recording requests can be received by the recorder module.

FIG. 4 is a block diagram of an example recordings database in accordance with some implementations. As shown in FIG. 4, the recordings database 400 includes a plurality of records 401a-401b. Although only two records 401a-401b are illustrated in FIG. 4, it is to be appreciated that the recordings database 400 can include any number of records. Each record 401a-401b includes a request ID field 410a-410b that stores a request ID, a source field 420a-420b that stores data indicative of a source (e.g., a channel ID) of a recording, a start time field 430a-430b that stores data indicative of a start time of the recording, an end time field 440a-440b that stores data indicative of an end time of the recording, a policy field 450a-450b that stores data indicative of a storage policy and an active field 460a-460b that stores a flag indicative of whether or not the record is active.

Figure 5:
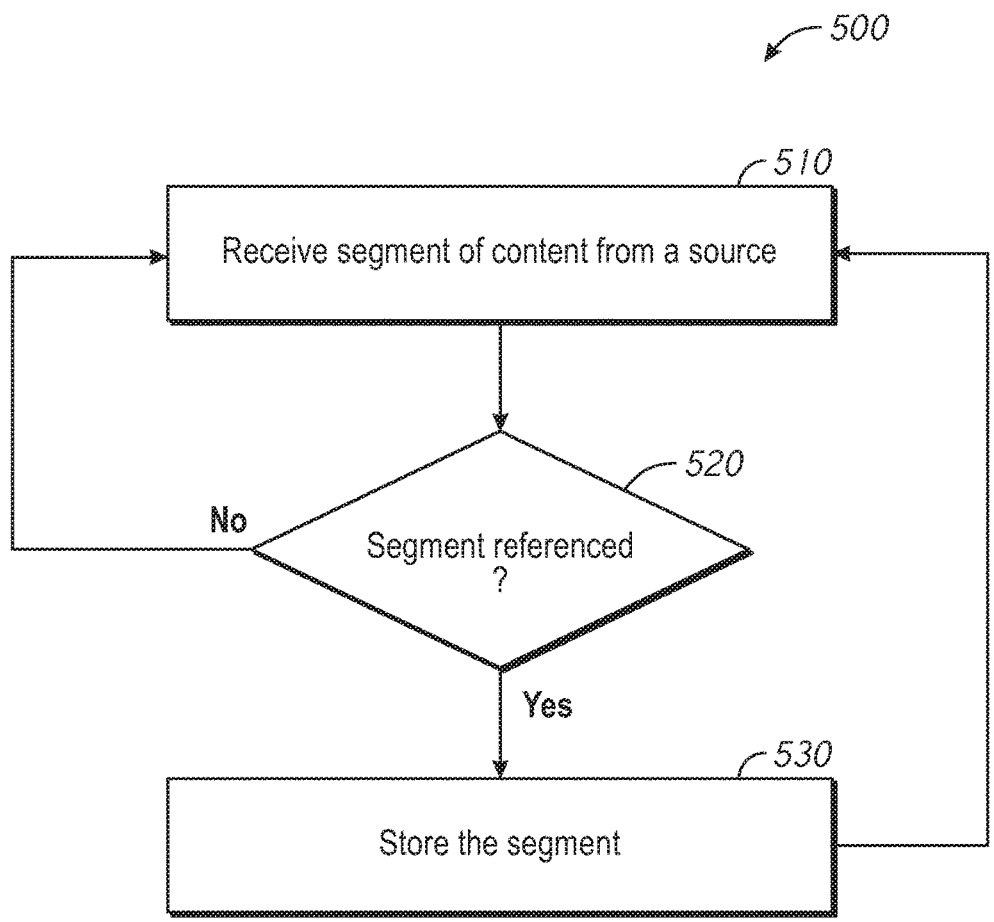
FIG. 5 is a flowchart representation of a method of handling a received segment in accordance with some implementations.

FIG. 5 is a flowchart representation of a method of handling a received segment in accordance with some implementations. In some implementations (and as detailed below as an example), the method 500 is performed by a recorder module, such as the recorder module 120 of FIG. 1. In some implementations, the method 500 is performed by processing logic, including hardware, firmware, software, or a combination thereof. In some implementations, the method 500 is performed by a processor executing code stored in a non-transitory computer-readable medium (e.g., a memory). Briefly, the method 500 includes receiving a segment and, if the segment is referenced by an active record, storing the segment.

The method 500 begins, in block 510, with the recorder module receiving a segment of content from a source. In some implementations, the recorder module receives the segment from an ingester module which receives (or retrieves) the segment from the source.

At block 520, the recorder module determines whether the segment is referenced by any active record in a recordings database (e.g., the recordings database 400 of FIG. 4). In particular, the segment can include metadata indicative the source of the segment and a time of the segment. If the source metadata of the data matches the source field 420a-420b of an active record and the time of the segments falls within the start time and end time of the record, the segment is referenced by an active record and the method 500 continues to block 530. If not, the method 500 returns to block 510 where additional segments are received from the source (and/or other sources).

At block 530, the recorder module stores the segment. In some implementations, the recorder module stores the segment in an object store. In some implementations, storing the segment includes storing the segment in the object store using a deterministic key name based on the source of the segment and the time of the segment (e.g., using the metadata). In some implementations, storing the segment includes storing the source of the segment and the time of the segment (e.g., the metadata) in a lookup table in association with an object ID of the object stored on the object store containing the segment.

In some implementations, the recorder module stores a unique copy of the segment for each active record that references the segment and has a storage policy indicating storage of a unique copy. In some implementations, the recorder module stores a common copy of the segment if any active record references the segment and has a storage policy indicating storage of a common copy.

Following block 530, the method 500 returns to block 510 where additional segments can be received by the recorder module from the source and/or other sources.

Figure 6:
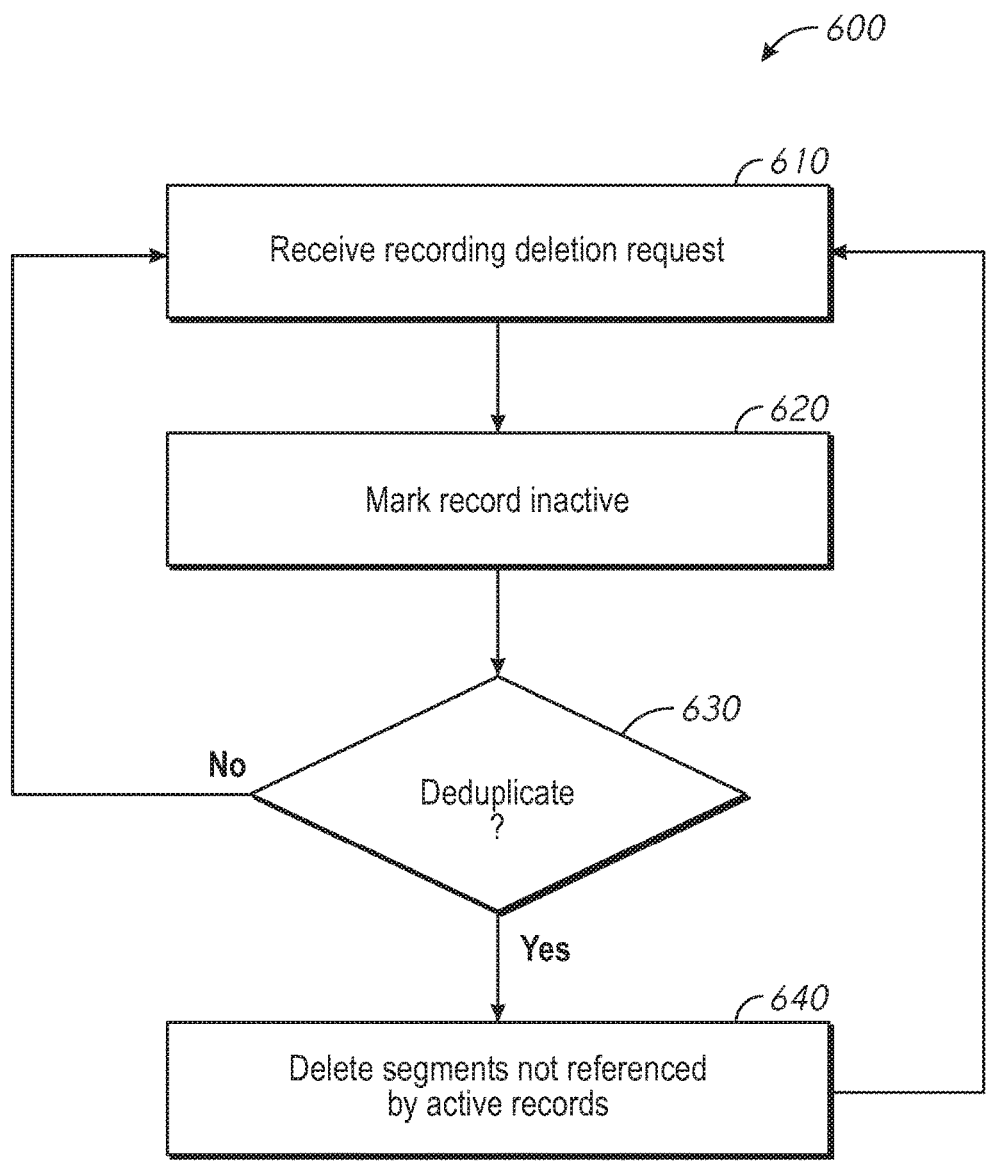
FIG. 6 is a flowchart representation of a method of handling a recording deletion request in accordance with some implementations.

FIG. 6 is a flowchart representation of a method of handling a recording deletion request in accordance with some implementations. In some implementations (and as detailed below as an example), the method 600 is performed by a recorder module, such as the recorder module 120 of FIG. 1. In some implementations, the method 600 is performed by processing logic, including hardware, firmware, software, or a combination thereof. In some implementations, the method 600 is performed by a processor executing code stored in a non-transitory computer-readable medium (e.g., a memory). Briefly, the method 600 includes receiving a recording deletion request and marking a corresponding record inactive. The method 600 optionally further includes deleting segments not referenced by active records.

The method 600 begins, in block 610, with the recorder module receiving a recording deletion request. The recording deletion request can include a request ID of a record of a recording database stored by the recorder module (e.g., the recording database 400 of FIG. 4).

At block 620, the recorder module marks as inactive the record in the recording database indicated by the recording deletion request. In some implementations, the recorder module changes a flag in an active field (e.g., the active field 460a-460b of FIG. 4) to indicate that the record is inactive.

At block 630, the recorder module determines whether to deduplicate the stored segments. In some implementations, the recorder module determines to deduplicate the stored segments in response to marking a record inactive. In some implementations, the recorder module determines to deduplicate stored segments in response to marking a threshold number of records inactive. For example, in some implementations, every tenth recording deletion request triggers deduplication. In some implementations, the recorder module determines to deduplicate stored segments periodically. For example, in some implementations, stored segments are deduplicated daily. Thus, if at block 630, the recording module determines that a day has passed since the last deduplication, the recording module determines to deduplicate the stored segments and the method 600 proceeds to block 640. If the recording module determines not to deduplicate the stored segments, the method 600 returns to block 610 where the recorder module can receive additional recording deletion requests.

At block 640, the recorder module deletes segments not referenced by active records. In some implementations, the recorder module stores a table of all segments that are stored in the object store. In some implementations, the recorder module request a list from the object store of the segments that are stored in the object store. In some implementations, deleting segments includes sending a command to the object store to delete the segments. In some implementations, the recorder module sends the recordings database to the object store and the object store deletes stored segments not referenced by any active record. In some implementations, the recorder module sends the recordings database to the object store with inactive records removed or sends the recordings database in an otherwise compressed format.

Following block 640, the method 600 returns to block 610 where the recorder module can receive additional recording deletion requests.

Figure 7:
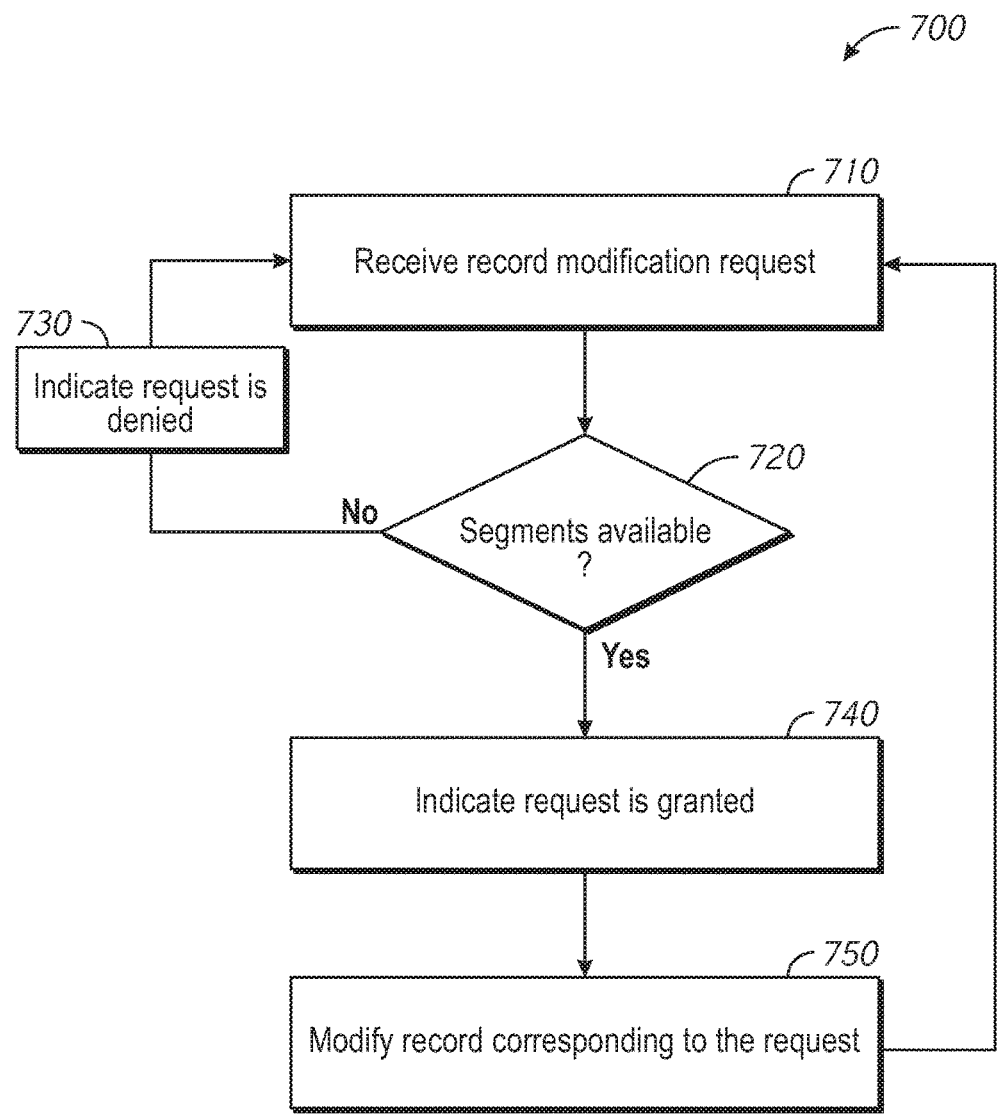
FIG. 7 is a flowchart representation of a method of handling a record modification request in accordance with some implementations.

FIG. 7 is a flowchart representation of a method of handling a record modification request in accordance with some implementations. In some implementations (and as detailed below as an example), the method 700 is performed by a recorder module, such as the recorder module 120 of FIG. 1. In some implementations, the method 700 is performed by processing logic, including hardware, firmware, software, or a combination thereof. In some implementations, the method 700 is performed by a processor executing code stored in a non-transitory computer-readable medium (e.g., a memory). Briefly, the method 700 includes receiving a record modification request and, if the request can be granted, modifying a record corresponding to the request.

The method 700 begins, in block 710, with the recorder module receiving a record modification request. The record modification request can include a request ID of a record of a recording database stored by the recorder module (e.g., the recording database 400 of FIG. 4). The record modification request can further include modified temporal data indicating a modified timespan for the recording. For example, the record modification request can include a modified start time, a modified end time, or both.

At block 720, the recorder module determines whether the segments indicated by the modified temporal data are available (e.g., are recorded or are recordable due to the time of the segment being in the future). If the recorder module determines that the segments are not available, the method 700 continues to block 730 where the recorder module indicates that the request is denied before returning to block 710 where the recorder module can receive additional record modification requests.

If the recorder module determines that the segments are available, the method 700 continues to block 740 where the recorder module indicates that the request is granted before continuing to block 750 where the recorder module modifying the record according to the request. In some implementations, the recorder module locates a record in a recordings database having the request ID of the record modification request stored in a request ID field. The recorder module then modifies the located record by replacing the data of the start time field and end time field with the modified temporal data.

Following block 750, the method 700 returns to block 710 where the recorder module can receive additional record modification requests.

In some implementations, at block 720, the recorder module can determine that some, but not all, of the segments indicated by the modified temporal data are available. In response, the recorder module can indicate that the request is partially granted and modify the corresponding record to reference the segments indicated by the modified temporal data that are available.

Figure 8:
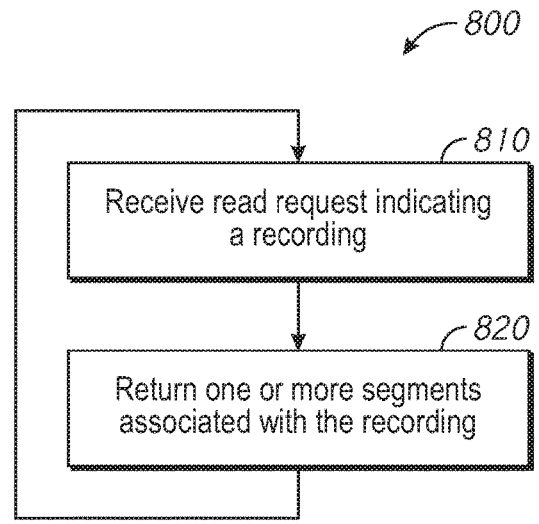
FIG. 8 is a flowchart representation of a method of handling a recording request in accordance with some implementations.

FIG. 8 is a flowchart representation of a method of handling a read request in accordance with some implementations. In some implementations (and as detailed below as an example), the method 800 is performed by a recorder module, such as the recorder module 120 of FIG. 1. In some implementations, the method 800 is performed by processing logic, including hardware, firmware, software, or a combination thereof. In some implementations, the method 800 is performed by a processor executing code stored in a non-transitory computer-readable medium (e.g., a memory). Briefly, the method 800 includes receiving a read request indicating a recording and returning one or more segments associated with the recording.

The method 800 begins, in block 810, with the recorder module receiving a read request indicating a recording. At block 820, in response to receiving the read request, the recorder module returns one or more segments associated with the recording. Following block 820, the method 800 returns to block 810 where additional read requests can be received by the recorder module.

In some implementations, the read request includes a request ID and the recording module locates a record in a recordings database having the request ID of the read request stored in a request ID field. The recorder module then retrieves (from the object store) segments referenced by the record (or at least those that have been recorded) and returns (to the requestor) the retrieved segments.

Figure 9:
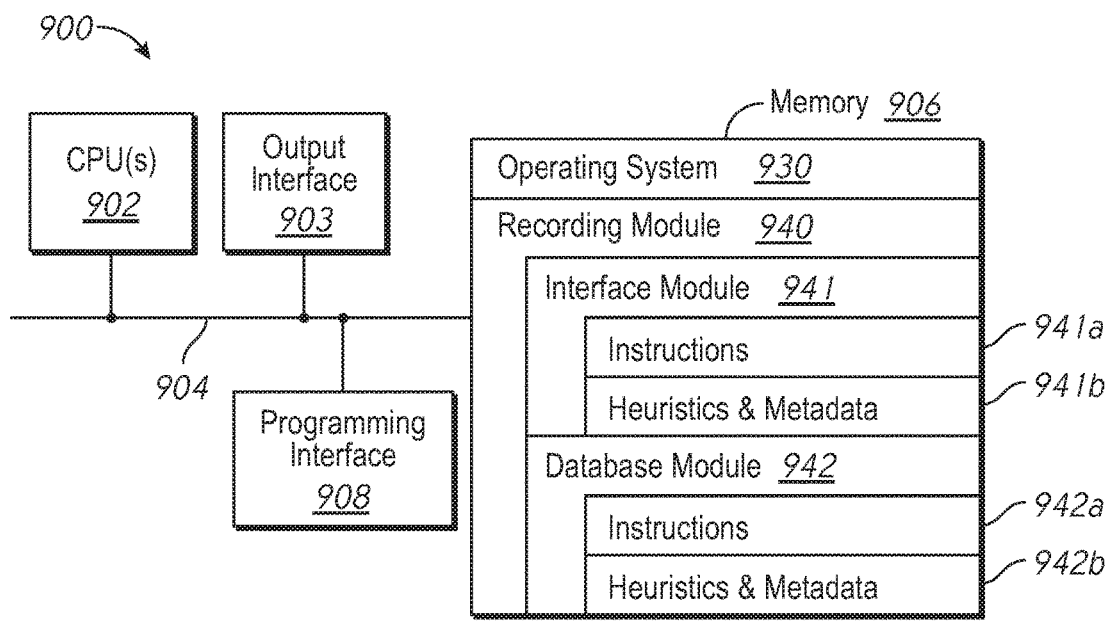
FIG. 9 is a block diagram of a computing device in accordance with some implementations.

FIG. 9 is a block diagram of a computing device 900 in accordance with some implementations. In some implementations, the computing device 900 corresponds to the recorder module 120 of FIG. 1 and performs one or more of the functionalities described above with respect to the recorder module 120. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 900 includes one or more processing units (CPU's) 902 (e.g., processors), one or more output interfaces 903 (e.g., a network interface), a memory 906, a programming interface 908, and one or more communication buses 904 for interconnecting these and various other components.

In some implementations, the communication buses 904 include circuitry that interconnects and controls communications between system components. The memory 906 includes high-speed random access memory, such as DRAM, SRAM, DDR RAM or other random access solid state memory devices; and, in some implementations, include non-volatile memory, such as one or more magnetic disk storage devices, optical disk storage devices, flash memory devices, or other non-volatile solid state storage devices. The memory 906 optionally includes one or more storage devices remotely located from the CPU(s) 902. The memory 906 comprises a non-transitory computer readable storage medium. Moreover, in some implementations, the memory 906 or the non-transitory computer readable storage medium of the memory 906 stores the following programs, modules and data structures, or a subset thereof including an optional operating system 930 and a recording module 940. In some implementations, one or more instructions are included in a combination of logic and non-transitory memory. The operating system 930 includes procedures for handling various basic system services and for performing hardware dependent tasks. In some implementations, the recording module 940 is configured to handle requests relating to recording segments of video data. To that end, the recording module 940 includes an interface module 941 and a database module 942.

In some implementations, the interface module 941 is configured to receive a segment of content. To that end, the interface module 941 includes a set of instructions 941a and heuristics and metadata 941b. In some implementations, the database module 942 is configured to determine that the segment is referenced by at least one active record of a recordings database. To that end, the database module 942 includes a set of instructions 942a and heuristics and metadata 942b. In some implementations, the interface module 941 is configured to, responsive to the determination, store the segment (e.g., in an object store).

Although the recording module 940, the interface module 941, and the database module 942 are illustrated as residing on a single computing device 900, it should be understood that in other embodiments, any combination of the recording module 940, the interface module 941, and the database module 942 can reside in separate computing devices in various implementations. For example, in some implementations each of the recording module 940, the interface module 941, and the database module 942 reside on a separate computing device.

Moreover, FIG. 9 is are intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 9 could be implemented in a single module and the various functions of single functional blocks could be implemented by one or more functional blocks in various embodiments.

The actual number of modules and the division of particular functions and how features are allocated among them will vary from one embodiment to another, and may depend in part on the particular combination of hardware, software and/or firmware chosen for a particular embodiment.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
at a storage system including an object store that stores unique copies of media content segments and common copies of media content segments, and a recordings database that stores records corresponding to recording requests:
receiving a plurality of recording requests and a plurality of incoming media content segments associated with the plurality of recording requests, wherein an incoming media content segment of the plurality of incoming media content segments includes metadata indicative of a source of the incoming media content segment and a time of the incoming media content segment;
generating a plurality of records corresponding to the plurality of recording requests, including for a recording request of the plurality of recording requests:
generating a record corresponding to the recording request for storage in the recordings database, the record including a request identifier, data indicative of a source of media content to be recorded, temporal data indicative of a timespan of the media content, storage policy data indicating whether to associate the record with a unique copy of the media content or a common copy of the media content, and a flag indicative of whether the record is active or inactive;
for a media content segment of the plurality of incoming media content segments:
identifying active records in the plurality of records referencing the media content segment, wherein the active records are marked as active in the recording database, a source of the media content segment matches a source of media content to be recorded indicated in the active records, and a time of the media content segment falls within timespans indicated in temporal data of the active records;
for each active record of the active records that references the media content segment and has storage policy data indicative of unique copy storage, storing a unique copy of the media content segment in the object store and an association of the media content segment with a request identifier of the active record; and
for multiple active records of the active records that reference the media content segment and have storage policy data indicative of common copy storage, storing a single common copy of the media content segment in the object store and associations of the media content segment with multiple request identifiers of the multiple active records.

2. The method of claim 1, wherein the multiple active records comprise all active records that reference the media content segment and have the storage policy data indicative of the common copy storage.

3. The method of claim 1, wherein generating the record in the recordings database includes determining a storage policy associated with the recording request.

4. The method of claim 3, wherein the storage policy is determined based on at least one of a location of a requestor of the recording request, the source of the content, nature of the media content, or rights to the media content.

5. The method of claim 1, further comprising:
receiving a recording deletion request indicating a particular record in the recordings database; and
marking the particular record in the recordings database inactive.

6. The method of claim 1, further comprising deleting media content segments not referenced by at least one active record in the recordings database.

7. The method of claim 1, further comprising:
receiving a record modification request indicating a particular record in the recordings database;
determining that media content segments indicated by the modification request are available; and
modifying the particular record in the recordings database according to the record modification request.

8. The method of claim 1, further comprising:
receiving a read request indicating a particular record in the recordings database; and
returning one or more media content segments associated with the particular record in the recordings database.

9. The method of claim 1, wherein storing the unique copy or storing the single common copy of the media content segment includes storing the media content segment using a deterministic key name based on segment metadata included in the media content segment.

10. The method of claim 1, wherein the storage system includes a cloud-based digital video recording (DVR) system.

11. A system comprising:
a network interface;
one or more processors; and
a non-transitory memory comprising:
an object store that stores unique copies of media content segments and common copies of media content segments;
a recordings database that stores records corresponding to recording requests; and
instructions that when executed cause the one or more processors to perform operations comprising:
receiving a plurality of recording requests and a plurality of incoming media content segments associated with the plurality of recording requests, wherein an incoming media content segment of the plurality of incoming media content segments includes metadata indicative of a source of the incoming media content segment and a time of the incoming media content segment;
generating a plurality of records corresponding to the plurality of recording requests, including for a recording request of the plurality of recording requests:
generating a record corresponding to the recording request for storage in the recordings database, the record including a request identifier, data indicative of a source of media content to be recorded, temporal data indicative of a timespan of the media content, storage policy data indicating whether to associate the record with a unique copy of the media content or a common copy of the media content, and a flag indicative of whether the record is active or inactive;
for a media content segment of the plurality of incoming media content segments:
identifying active records in the plurality of records referencing the media content segment, wherein the active records are marked as active in the recording database, a source of the media content segment matches a source of content to be recorded indicated in the active records, and a time of the media content segment falls within timespans indicated in temporal data of the active records;
for each active record of the active records that references the media content segment and has storage policy data indicative of unique copy storage, storing a unique copy of the media content segment in the object store and an association of the media content segment with a request identifier of the active record; and
for multiple active records of the active records that reference the media content segment and have storage policy data indicative of common copy storage, storing a single common copy of the media content segment in the object store and associations of the media content segment with multiple request identifiers of the multiple active records.

12. The system of claim 11 further comprise a cloud-based digital video recording (DVR) system.

13. The system of claim 11, wherein the multiple active records comprise all active records that reference the segment and have the storage policy data indicative of the common copy storage.

14. The system of claim 13, wherein generating the record in the recordings database includes determining a storage policy associated with recording request based on at least one of a location of a requestor of the recording request, the source of the media content, nature of the media content, or rights to the media content.

15. The system of claim 13, wherein the operations further comprise deleting media content segments not referenced by at least one active record in the recordings database.

16. The method of claim 9, wherein the segment metadata includes at least one of a channel identifier, a start time, or an end time; and the method further includes retrieving the media content segment from the object store according to a particular channel identifier, a particular start time, or a particular end time.

17. The system of claim 11, wherein storing the unique copy or storing the single common copy of the media content segment includes storing the media content segment using a deterministic key name based on segment metadata included in the media content segment.

18. The system of claim 17, wherein the segment metadata includes at least one of a channel identifier, a start time, or an end time; and the operations further include retrieving the media content segment from the object store according to a particular channel identifier, a particular start time, or a particular end time.

19. The system of claim 11, wherein the operations further comprise:
receiving a recording deletion request indicating a particular record in the recordings database; and
marking the particular record in the recordings database inactive.

20. The system of claim 11, wherein the operations further comprise:
receiving a record modification request indicating a particular record in the recordings database;
determining that media content segments indicated by the modification request are available; and
modifying the particular record in the recordings database according to the record modification request.

* * * * *